(12) United States Patent
George et al.

(10) Patent No.: US 8,020,314 B2
(45) Date of Patent: Sep. 20, 2011

(54) METHODS AND APPARATUS FOR DRYING CERAMIC GREEN BODIES WITH MICROWAVES

(75) Inventors: Jacob George, Horseheads, NY (US); Parasuram Padmanabhan Harihara, Painted Post, NY (US); Min Shen, Corning, NY (US)

(73) Assignee: Corning Incorporated, Corning, NY (US)

( * ) Notice: Subject to any disclaimer, the term of this patent is extended or adjusted under 35 U.S.C. 154(b) by 578 days.

(21) Appl. No.: 12/262,902

(22) Filed: Oct. 31, 2008

(65) Prior Publication Data
US 2010/0107435 A1 May 6, 2010

(51) Int. Cl.
*F26B 11/03* (2006.01)
(52) U.S. Cl. ............ 34/259; 34/264; 34/265; 34/381; 34/90; 34/218; 705/14; 429/26; 429/30; 435/41; 435/6; 427/372.2; 427/98.4; 219/463.1
(58) Field of Classification Search .............. 34/259, 34/264, 265, 90, 381, 218; 429/26, 30; 705/14; 427/372.2, 98.4; 219/463.1; 435/6, 41
See application file for complete search history.

(56) References Cited

U.S. PATENT DOCUMENTS

| | | | |
|---|---|---|---|
| 3,953,703 A * | 4/1976 | Hurwitt .................. | 219/700 |
| 5,214,442 A | 5/1993 | Roller | |
| 5,484,750 A * | 1/1996 | Greskovich et al. ........... | 501/86 |
| 5,631,052 A * | 5/1997 | Andersen et al. ............ | 428/34.5 |
| 5,633,213 A * | 5/1997 | Aghajanian et al. ........... | 501/87 |
| 5,654,048 A * | 8/1997 | Andersen et al. ............ | 428/34.5 |
| 5,675,212 A * | 10/1997 | Schmid et al. ............... | 313/422 |
| 5,801,073 A * | 9/1998 | Robbins et al. ............... | 438/125 |
| 5,834,840 A * | 11/1998 | Robbins et al. ............... | 257/705 |
| 5,848,348 A * | 12/1998 | Dennis ........................ | 419/5 |
| 5,865,930 A * | 2/1999 | Schmid et al. ............... | 156/265 |
| 5,911,941 A * | 6/1999 | Rokhvarger et al. ......... | 264/432 |
| 5,916,396 A * | 6/1999 | Schmid et al. ............. | 156/89.16 |
| 5,951,908 A * | 9/1999 | Cui et al. .................. | 252/62.9 R |
| 5,985,067 A * | 11/1999 | Schmid et al. ............. | 156/89.16 |

(Continued)

FOREIGN PATENT DOCUMENTS

CH 665921 A * 6/1988

(Continued)

OTHER PUBLICATIONS

Tayel, M., et al., "A fuzzy logic controller for a dry rotary cement kiln", IEEE, 1997, pp. 1525-1531.

(Continued)

*Primary Examiner* — Stephen M. Gravini
(74) *Attorney, Agent, or Firm* — Joseph M. Homa

(57) ABSTRACT

Methods and apparatus for drying ceramic green bodies include providing one or more ceramic green bodies in a microwave heating chamber operatively connected to a microwave source and a PLC. The total mass of the ceramic green bodies present in the microwave heating chamber is determined. Microwave energy is generated with the microwave source and transmitted from the microwave source to the microwave heating chamber. A transmitted power of the microwave energy transmitted from the microwave source to the microwave heating chamber is measured with power sensors. The reflected power of reflected microwave energy reflected back from the microwave heating chamber is also measured. The power of the microwave energy transmitted from the microwave source to the microwave heating chamber is adjusted based on the total mass of ceramic green bodies present in the microwave heating chamber, the measured transmitted power and the measured reflected power.

18 Claims, 3 Drawing Sheets

U.S. PATENT DOCUMENTS

| | | | | |
|---|---|---|---|---|
| 6,011,248 A * | 1/2000 | Dennis | | 219/700 |
| 6,083,861 A * | 7/2000 | Saruhan et al. | | 501/128 |
| 6,128,831 A | 10/2000 | Durance et al. | | |
| 6,150,645 A | 11/2000 | Lewis et al. | | |
| 6,157,123 A * | 12/2000 | Schmid et al. | | 313/422 |
| 6,259,078 B1 * | 7/2001 | Araya | | 219/709 |
| 6,261,703 B1 * | 7/2001 | Sasaki et al. | | 428/627 |
| 6,271,579 B1 * | 8/2001 | Going et al. | | 257/664 |
| 6,448,539 B2 * | 9/2002 | Ose et al. | | 219/463.1 |
| 6,455,826 B1 | 9/2002 | Araya et al. | | |
| 6,489,718 B1 * | 12/2002 | Schmid et al. | | 313/495 |
| 6,521,004 B1 * | 2/2003 | Culler et al. | | 51/298 |
| 6,544,458 B1 * | 4/2003 | Hansma | | 264/234 |
| 6,572,830 B1 * | 6/2003 | Burdon et al. | | 422/186.29 |
| 6,620,214 B2 * | 9/2003 | McArdle et al. | | 51/298 |
| 6,706,233 B2 * | 3/2004 | Araya et al. | | 264/432 |
| 6,726,312 B1 * | 4/2004 | Fujimura et al. | | 347/68 |
| 6,743,534 B2 * | 6/2004 | Lautzenhiser et al. | | 428/701 |
| 6,769,969 B1 * | 8/2004 | Duescher | | 451/59 |
| 6,777,868 B1 * | 8/2004 | Kosaka et al. | | 313/495 |
| 6,809,469 B1 * | 10/2004 | Ito et al. | | 313/495 |
| 6,867,400 B2 | 3/2005 | Collins et al. | | |
| 6,875,619 B2 * | 4/2005 | Blackburn, Gary | | 506/9 |
| 6,881,483 B2 * | 4/2005 | McArdle et al. | | 428/403 |
| 6,913,824 B2 * | 7/2005 | Culler et al. | | 428/401 |
| 6,932,145 B2 * | 8/2005 | Frasier et al. | | 164/122.2 |
| 6,938,358 B2 | 9/2005 | Lyle et al. | | |
| 6,949,156 B2 * | 9/2005 | Lautzenhiser et al. | | 156/89.12 |
| 6,991,507 B2 * | 1/2006 | Ito et al. | | 445/24 |
| 7,045,237 B2 * | 5/2006 | Sridhar et al. | | 429/465 |
| 7,056,468 B2 * | 6/2006 | Chiu et al. | | 264/650 |
| 7,067,208 B2 * | 6/2006 | Gottmann et al. | | 429/465 |
| 7,087,874 B2 | 8/2006 | Ishikawa et al. | | |
| 7,135,248 B2 * | 11/2006 | Finn et al. | | 429/459 |
| 7,144,651 B2 * | 12/2006 | Finn et al. | | 429/460 |
| 7,195,872 B2 * | 3/2007 | Agrawal et al. | | 435/6 |
| 7,255,956 B2 * | 8/2007 | McElroy et al. | | 429/486 |
| 7,291,444 B2 * | 11/2007 | Yamashiki et al. | | 430/284.1 |
| 7,297,650 B2 * | 11/2007 | Chiu et al. | | 501/134 |
| 7,309,270 B2 * | 12/2007 | Ito et al. | | 445/24 |
| 7,377,305 B2 * | 5/2008 | Frasier et al. | | 164/338.1 |
| 7,410,716 B2 * | 8/2008 | Garner et al. | | 429/465 |
| 7,520,800 B2 * | 4/2009 | Duescher | | 451/527 |
| 7,658,778 B2 * | 2/2010 | Pope et al. | | 55/523 |
| 7,682,664 B2 * | 3/2010 | Dombsky et al. | | 427/372.2 |
| 7,732,002 B2 * | 6/2010 | Kodas et al. | | 427/58 |
| 2001/0019048 A1 * | 9/2001 | Ose et al. | | 219/463.1 |
| 2002/0066233 A1 * | 6/2002 | McArdle et al. | | 51/308 |
| 2002/0084555 A1 * | 7/2002 | Araya et al. | | 264/430 |
| 2002/0095871 A1 * | 7/2002 | McArdle et al. | | 51/298 |
| 2003/0062145 A1 * | 4/2003 | Frasier et al. | | 164/122.1 |
| 2003/0087136 A1 * | 5/2003 | Lautzenhiser et al. | | 428/701 |
| 2003/0108664 A1 * | 6/2003 | Kodas et al. | | 427/125 |
| 2003/0119656 A1 * | 6/2003 | Chiu et al. | | 501/138 |
| 2003/0134410 A1 * | 7/2003 | Silva et al. | | 435/287.2 |
| 2003/0148401 A1 * | 8/2003 | Agrawal et al. | | 435/7.9 |
| 2003/0157386 A1 * | 8/2003 | Gottmann et al. | | 429/26 |
| 2003/0157503 A1 * | 8/2003 | McGarry et al. | | 435/6 |
| 2003/0162067 A1 * | 8/2003 | McElroy | | 429/26 |
| 2003/0165732 A1 * | 9/2003 | McElroy | | 429/44 |
| 2003/0170527 A1 * | 9/2003 | Finn et al. | | 429/34 |
| 2003/0180602 A1 * | 9/2003 | Finn et al. | | 429/38 |
| 2003/0190608 A1 * | 10/2003 | Blackburn | | 435/6 |
| 2003/0224238 A1 * | 12/2003 | Finn et al. | | 429/35 |
| 2004/0022691 A1 * | 2/2004 | Allen et al. | | 422/102 |
| 2004/0026833 A1 * | 2/2004 | Culler et al. | | 264/461 |
| 2004/0104514 A1 | 6/2004 | Ishikawa et al. | | |
| 2004/0159390 A1 * | 8/2004 | Lautzenhiser et al. | | 156/89.12 |
| 2004/0161997 A1 * | 8/2004 | Ito et al. | | 445/24 |
| 2004/0221515 A1 * | 11/2004 | McArdle et al. | | 51/308 |
| 2004/0249040 A1 * | 12/2004 | Yamashiki et al. | | 524/418 |
| 2004/0265664 A1 * | 12/2004 | Badding et al. | | 429/30 |
| 2005/0009101 A1 * | 1/2005 | Blackburn | | 435/7.1 |
| 2005/0032469 A1 * | 2/2005 | Duescher | | 451/548 |
| 2005/0074650 A1 * | 4/2005 | Sridhar et al. | | 429/30 |
| 2005/0093209 A1 | 5/2005 | Bergman et al. | | |
| 2005/0095482 A1 * | 5/2005 | Garner et al. | | 429/30 |
| 2005/0118939 A1 * | 6/2005 | Duescher | | 451/527 |
| 2005/0176575 A1 * | 8/2005 | Chiu et al. | | 501/134 |
| 2005/0212626 A1 * | 9/2005 | Takamatsu | | 333/212 |
| 2005/0269055 A1 * | 12/2005 | Frasier et al. | | 164/361 |
| 2006/0040064 A1 * | 2/2006 | Dombsky et al. | | 427/491 |
| 2006/0059877 A1 * | 3/2006 | Yoshida | | 55/523 |
| 2006/0118266 A1 * | 6/2006 | Frasier et al. | | 164/122.1 |
| 2006/0183625 A1 * | 8/2006 | Miyahara | | 501/98.4 |
| 2006/0288678 A1 * | 12/2006 | Yoshida | | 55/523 |
| 2007/0023971 A1 * | 2/2007 | Saha et al. | | 264/432 |
| 2007/0084460 A1 * | 4/2007 | Beckman | | 126/625 |
| 2007/0117271 A1 * | 5/2007 | Kodas et al. | | 438/122 |
| 2007/0122932 A1 * | 5/2007 | Kodas et al. | | 438/57 |
| 2007/0178232 A1 * | 8/2007 | Kodas et al. | | 427/180 |
| 2007/0236130 A1 * | 10/2007 | Ito et al. | | 313/495 |
| 2007/0273070 A1 * | 11/2007 | Badding et al. | | 264/618 |
| 2008/0184686 A1 * | 8/2008 | Pope et al. | | 55/521 |
| 2008/0264295 A1 * | 10/2008 | Taylor et al. | | 106/31.13 |
| 2009/0008142 A1 * | 1/2009 | Shimizu et al. | | 174/261 |
| 2009/0130607 A1 * | 5/2009 | Slafer | | 430/323 |
| 2009/0166355 A1 * | 7/2009 | Brundage et al. | | 219/696 |
| 2009/0226781 A1 * | 9/2009 | Devoe et al. | | 429/20 |
| 2010/0048374 A1 * | 2/2010 | Liu et al. | | 501/4 |
| 2010/0104910 A1 * | 4/2010 | Devoe et al. | | 429/26 |
| 2010/0107435 A1 * | 5/2010 | George et al. | | 34/259 |
| 2010/0112195 A1 * | 5/2010 | Kodas et al. | | 427/98.4 |
| 2011/0033887 A1 * | 2/2011 | Fang et al. | | 435/41 |

FOREIGN PATENT DOCUMENTS

| | | | |
|---|---|---|---|
| CH | 665921 A5 * | 6/1988 | |
| DE | 3504376 A1 * | 11/1986 | |
| DE | 4339267 A1 * | 5/1995 | |
| DE | 19938807 A1 * | 9/2000 | |
| DE | 19938811 A1 * | 9/2000 | |
| DE | 10 2007 000 503 | 5/2008 | |
| EP | 162620 A2 * | 11/1985 | |
| EP | 447206 A2 * | 9/1991 | |
| EP | 0 467 625 A2 | 1/1992 | |
| EP | 722069 A2 * | 7/1996 | |
| FR | 2689214 A1 * | 10/1993 | |
| GB | 2203529 A * | 10/1988 | |
| GB | 2255001 A * | 10/1992 | |
| JP | 54099557 A * | 8/1979 | |
| JP | 55122870 A * | 9/1980 | |
| WO | 97/36502 | 10/1997 | |
| WO | WO 9853475 A1 * | 11/1998 | |
| WO | WO 2004034480 A1 * | 4/2004 | |
| WO | WO 2004049392 A1 * | 6/2004 | |
| WO | WO 2010046509 A1 * | 4/2010 | |
| WO | WO 2010051337 A1 * | 5/2010 | |

OTHER PUBLICATIONS

Islam, Md, R., et al., "Microprocessor based temperature monitoring and control system using fuzzy logic controller", 5th International Conference on Electrical and Computer Engineering, , Dec. 20-22, 2008, pp. 878-882.

Gao, Z., et al., "A stable self-tuning fuzzy logic control system for industrial temperature regulation", 2000 IEEE, pp. 1232-1240.

Wilkinson, J., "Additional advances in fuzzy logic temperature control", 1995 IEEE, pp. 2721-2725.

Mota, A.M., et al., "An adaptive control system for an industrial tunnel kiln", 1993 IEEE, pp. 102-104.

Babary, J.P., "Modelling and adaptive open loop control of tunnel kilns", Proceedings of the 24th Conference on Decision and Control, Ft. Lauderdale, FL, Dec. 1985, 1985 IEEE, pp. 1168-1171.

* cited by examiner

METHODS AND APPARATUS FOR DRYING CERAMIC GREEN BODIES WITH MICROWAVES

BACKGROUND

1. Field

The present invention relates generally to methods and apparatus for manufacturing ceramic materials and, more particularly to methods and apparatus for heating and drying ceramic green bodies with microwaves.

2. Technical Background

Conventional heating or drying comprising convectional or a combination of convectional and radiative gas or electric resistance heating is commonly used in the manufacture of ceramic materials to remove moisture from ceramic green bodies. However, the heating rate, temperature control and application of heat associated with these conventional heating methods often results in high energy consumption and inconsistent product quality.

Industrial heating by microwave radiation has been used to accelerate the drying of ceramic green bodies. In comparison with conventional heating, microwave heating provides a higher heating rate and is generally faster than conventional drying because the ceramic body is heated directly through the interaction of the microwave energy with the ceramic green body. A single microwave applicator or a plurality of microwave applicators may be employed to heat and dry the ceramic green bodies.

However, while heating and drying ceramic green bodies by the application of microwave energy offers advantages over other heating and drying methods, microwave heating and drying systems currently used also have several drawbacks. For example, current microwave heating and drying systems do not adequately account for load variations in the microwave heating chamber of the heating and drying system which may result in temperature variations between individual ceramic green bodies dried under the same conditions. The temperature variations between individual ceramic green bodies may decrease the throughput of the microwave heating and drying system as some ceramic green bodies may not be adequately dried and, as a result, may need to be reprocessed. Alternatively, the ceramic green bodies may be over dried which can result in cracking. Moreover, the quality and consistency of the resultant ceramic material may be adversely affected due to variations in the moisture content of the ceramic green bodies following drying.

Accordingly, a need exists for alternative methods, apparatus and systems for heating and drying ceramic green bodies with microwave energy.

SUMMARY

According to one embodiment shown and described herein, a method for heating ceramic green bodies includes providing one or more of the ceramic green bodies in a microwave heating chamber. The total mass of the one or more ceramic green bodies present in the microwave heating chamber is determined. Microwave energy is generated with a microwave source and transmitted from the microwave source to the microwave heating chamber. A transmitted power of the microwave energy transmitted from the microwave source to the microwave heating chamber is measured. The reflected power of reflected microwave energy reflected back from the microwave heating chamber is also measured. The power of the microwave energy transmitted from the microwave source to the microwave heating chamber is adjusted in response to: inputs corresponding to the total mass of the one or more ceramic green bodies present in the microwave heating chamber, the measured transmitted power and the measured reflected power.

The combination of a microwave dryer and ceramic green bodies includes a microwave source, a transmitted power sensor, a reflected power sensor, a controller and a microwave heating chamber. The microwave source may be operatively coupled to the microwave heating chamber such that microwave energy generated by the microwave source is transmitted to the microwave heating chamber thereby heating ceramic green bodies positioned in the microwave heating chamber. The transmitted power sensor may be disposed between the microwave source and the microwave heating chamber and is operable to measure a transmitted power of the microwave energy transmitted by the microwave source to the microwave heating chamber. The reflected power sensor may be disposed between the microwave heating chamber and the microwave source and is operable to measure a reflected power of reflected microwave energy reflected from the microwave heating chamber. The controller may be operatively connected to the microwave source, the transmitted power sensor and the reflected power sensor and is operable to adjust a power of the microwave energy generated by the microwave source based on electrical signals received from the transmitted power sensor and the reflected power sensor and thereby control the heating of the ceramic green bodies positioned in the microwave heating chamber.

In yet another embodiment, the combination of a dryer system and ceramic green bodies includes a plurality of microwave dryers and a transport system. The microwave dryers may be oriented along the transport system such that the transport system passes the ceramic green bodies through each microwave dryer. The microwave dryers may include a microwave source, a transmitted power sensor, a reflected power sensor, a programmable controller and a microwave heating chamber. The microwave source may be operatively coupled to the microwave heating chamber such that microwave energy generated by the microwave source may be transmitted to the microwave heating chamber. The transmitted power sensor may be disposed between the microwave source and the microwave heating chamber and is operable to measure a transmitted power of microwave energy transmitted by the microwave source to the microwave heating chamber. The reflected power sensor may be disposed between the microwave heating chamber and the microwave source and is operable to measure a reflected power of reflected microwave energy reflected from the microwave heating chamber. The controller may be operatively connected to the microwave source, the transmitted power sensor and the reflected power sensor and is operable to adjust a power of the microwave energy generated by the microwave source based on electrical signals received from the transmitted power sensor and the reflected power sensor. The microwave dryers may be individually programmed to selectively heat ceramic green bodies passing through the microwave heating chamber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION OF THE PREFERRED EMBODIMENTS

Figure 1:
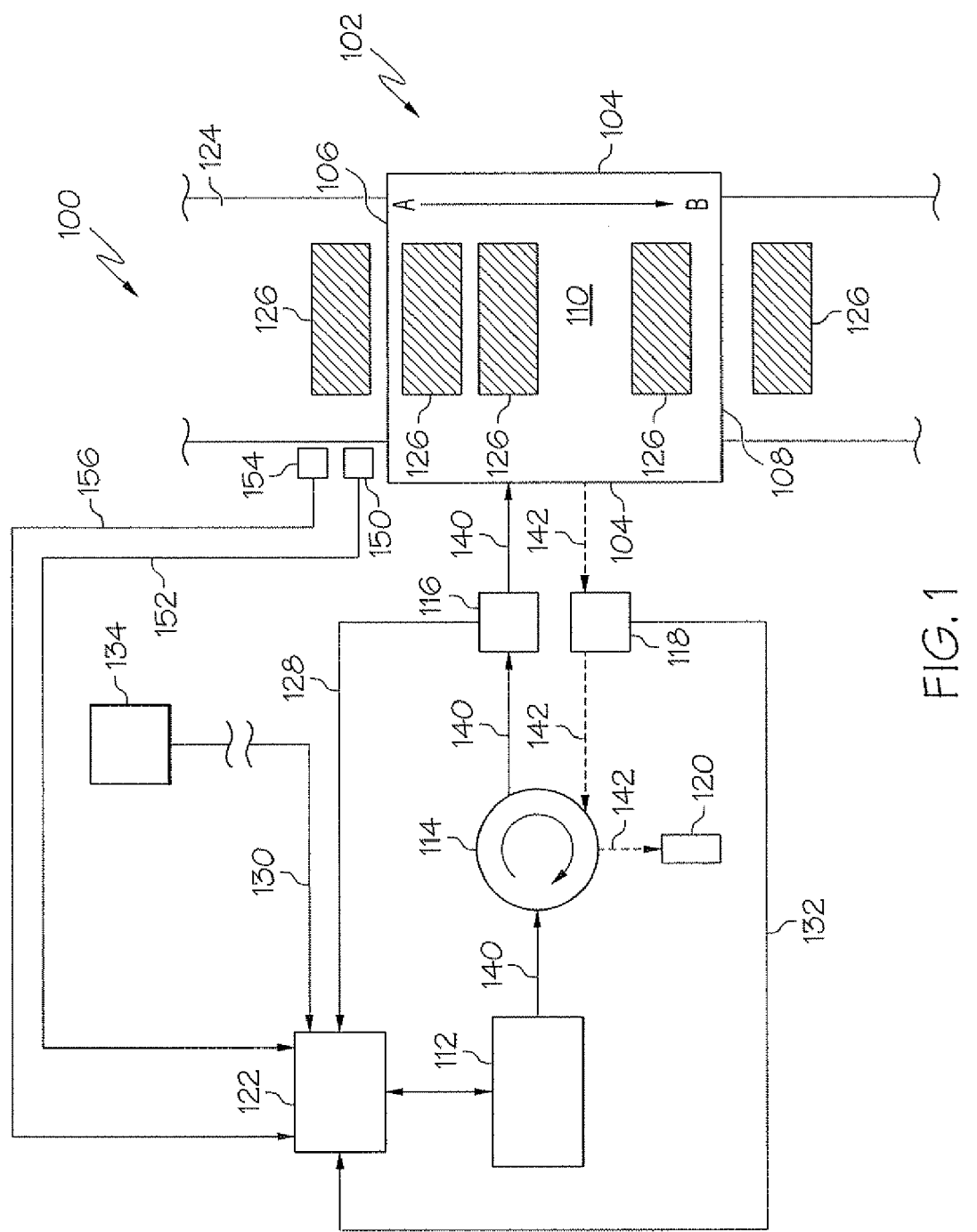
FIG. 1 is a schematic view of a microwave dryer for heating ceramic green bodies with microwaves according to one or more embodiments shown and described herein.

Reference will now be made in detail to FIG. 1 which shows a microwave dryer for heating green ceramic bodies according to one embodiment shown and described herein. The microwave dryer generally comprises a microwave heating chamber, a microwave source, a transmitted power sensor, a reflected power sensor and a programmable logic controller. The various elements of the microwave dryer, systems employing the microwave dryer and methods for heating green ceramic bodies will be discussed in further detail herein. Whenever possible, the same reference numerals will be used throughout the drawings to refer to the same or like parts.

As illustrated in FIG. 1, a microwave dryer 100 for heating green ceramic bodies generally comprises a microwave source 112, a microwave heating chamber 102, a programmable logic controller (PLC) 122, a transmitted power sensor 116 and a reflected power sensor 118.

The microwave heating chamber 102 generally comprises an entrance 106, an exit 108, sidewalls 104, a top 110 and bottom (not shown). In one embodiment, the sidewalls 104 top 110 and bottom may be formed from a microwave-impermeable, non-magnetic material that may exhibit a high electrical conductivity and resistance to oxidation at temperatures in the range of 200° C. Each of the top 110, bottom and sidewalls 104 of the microwave heating chamber 102 may comprise an inner shell and an outer shell with a layer of insulation (e.g., fiberglass or a comparable insulating material) disposed therebetween. The microwave heating chamber 102 may be configured such that ceramic green bodies 126 may pass continuously through the inside of the microwave heating chamber 102 along the flow axis (e.g., in the direction of the arrow from A to B) of the microwave heating chamber 102. This flow axis approximates the path of the ceramic green bodies 126 through the microwave heating chamber 102, such as when the microwave dryer 100 is a continuous throughput apparatus. The entrance 106 and exit 108 of the microwave heating chamber 102 may be equipped with shielding to reduce radiation leakage from the microwave heating chamber 102 while still permitting the flow of ceramic green bodies 126 into and out of the chamber.

In one embodiment, the microwave heating chamber 102 may be multimodal such that the microwave heating chamber 102 is able to support a large number of resonant modes in a given microwave frequency range. In another embodiment, the microwave heating chamber includes a mode stirrer (not shown) to provide uniformity of the electric field distribution within the microwave heating chamber.

To facilitate continuous throughput, the microwave dryer 100 may comprise a transport system 124 for transporting the green ceramic bodies 126 through the microwave heating chamber 102. The transport system 124 may extend through the interior of the microwave heating chamber 102 from the entrance 106 to the exit 108. In one embodiment, the transport system 124 comprises a conveyor, such as a belt conveyor or a chain-link conveyor, on which the ceramic green bodies 126 may be positioned. However, it should be understood that the transport system 124 may comprise any suitable system for conveying ceramic bodies through the microwave heating chamber 102 from the entrance 106 to the exit 108. Accordingly, no particular limitation is intended as to the type of transport system used to convey the ceramic green bodies through the microwave heating chamber 102.

A microwave source 112 for directing microwave power into the microwave heating chamber 102 may be operatively coupled to the microwave heating chamber 102 such that microwave energy generated by the microwave source 112 may be transmitted to the microwave heating chamber 102. In one embodiment, the microwave source 112 may be operatively coupled to the microwave heating chamber 102 with a microwave transmission line, such as a waveguide or leaky waveguide (not shown). The microwave source 112 may be an adjustable microwave generator or source such that the power and frequency of the microwave energy generated by the microwave source 112 may be adjusted as will be discussed in more detail herein.

In one embodiment, the microwave source 112 employed to generate microwave energy may comprise any conventional magnetron with an adjustable power feature. The frequency of the generated microwave energy may be greater than about 900 MHz (0.9 GHz). In one embodiment, the frequency of the microwave energy generated by the microwave source is from about 10 MHz to about 100 GHz, and, more particularly, frequencies from about 1 GHz to about 2.45 GHz which generally corresponds to the industrial microwave band in the United States. In other countries, other microwave frequencies may be utilized in the range from about 10 MHz to about 100,000 MHz. The power of the generated microwave energy may be no greater than that required to raise the temperature of the ceramic green bodies in the microwave heating chamber 102 to a temperature effective for drying the ceramic green bodies. Generally, the microwave source 112 may be operable to vary the power of the emitted microwaves up to about 200 kW. For example, the microwave source 112 may be capable of generating microwave energy having a power of about 30 kW to about 60 kW with a frequency of about 20 MHz up to about 5000 MHz. Magnetrons of this type may generate microwave energy sufficient to rapidly raise the temperature within the ceramic green body to a drying temperature in as little as 1 to 10 minutes depending on several factors including, without limitation, the load (e.g., the total weight of the ceramic green bodies in the microwave heating chamber including the weight of moisture in the ceramic green bodies), the geometrical configuration of the ceramic green bodies, the compositions of the ceramic green bodies, the positioning of the ceramic green bodies, and the rate at which the ceramic green bodies pass through the microwave heating chamber.

As shown in FIG. 1, a circulator 114 may be disposed between the microwave source 112 and the microwave heating chamber 102. Microwave energy transmitted from the microwave source 112 to the microwave heating chamber 102 (e.g., the transmitted microwave energy 140) passes through the circulator and into the microwave heating chamber 102. Microwave energy may also be reflected from the microwave heating chamber 102 back toward the microwave source 112. The reflected microwave energy 142 is diverted by the circulator 114 into a dissipating load 120 operatively connected to the circulator 114 thereby preventing damage to the microwave source 112 by the reflected microwave energy 142.

To facilitate control of the microwave source 112, the microwave source may be electrically coupled to a programmable logic controller (PLC) 122. The PLC 122 may be operable to vary the power and frequency of the microwave energy generated by the microwave source 112. In one embodiment, the PLC 122 may be operable to send electrical signals to the microwave source 112 to vary the power and/or frequency of the microwave energy 122 generated by the microwave source 112. The PLC 122 may also be operable to receive signals from the microwave source 112 indicative of the power and/or frequency of the microwave energy being generated by the microwave source 112.

The inventors have discovered that the amount of transmitted microwave energy 140 dissipated in the microwave heating chamber 102 (e.g., the portion of the transmitted microwave energy 140 which goes into heating and drying ceramic green bodies 126 positioned in the microwave heating chamber) may vary depending on such factors as load (e.g., the total weight of ceramic green bodies in the microwave heating chamber 102 which is equal to the summation of the weight of full bodies in the microwave applicator and/or a fraction of the weight of a body, if the body is only partly in the applicator), distribution (e.g., the spacing between the green ceramic bodies), composition and geometry of the ceramic green bodies positioned in the microwave heating chamber 102. Geometry of the ceramic green body, as used herein, refers to the shape of the ceramic green body as well as the structure of the ceramic green body. For example, a ceramic green body having a cellular structure with thin cell walls may reflect microwave energy differently than a ceramic green body with thicker cell walls. Moreover, the composition of the ceramic green body may also effect the manner in which the body reflects microwave energy. For example, a material with a low dielectric coefficient may reflect more microwave energy than a material with a higher dielectric coefficient.

The portion of the transmitted microwave energy 140 that is not dissipated in the microwave heating chamber 102 is reflected by the microwave heating chamber 102 back towards the microwave source as reflected microwave energy 142. The inventors have also determined that variability in the microwave energy dissipated in the microwave heating chamber 102 leads to temperature variations between ceramic green bodies heated with the same magnitude of transmitted microwave power. These temperature variations may lead to under drying of the ceramic green bodies (e.g., "cold log" conditions) or over drying of the ceramic green bodies (e.g., "hot log" conditions), either of which may adversely impact the throughput of the microwave dryer 100 and the ceramic manufacturing process in which the microwave dryer is incorporated as well as adversely effecting the quality of the final ceramic product. Further, the inventors have also discovered that, by measuring, among other variables, the power of the transmitted microwave energy 140 and the power of the reflected microwave energy 142 and adjusting the power of the microwave energy generated by the microwave source 112 based on these measured values, temperature variability between ceramic green bodies may be reduced and the occurrence of cold log and hot log conditions reduced and/or mitigated.

Referring again to FIG. 1, the microwave dryer 100 may comprise a transmitted power sensor 116 and a reflected power sensor 118. The transmitted power sensor 116 is disposed between the microwave source 112 and the microwave heating chamber 102 and is operable to measure the power of the transmitted microwave energy 140. The reflected power sensor 118 is disposed between the microwave heating chamber 102 and the microwave source 112, specifically between the microwave heating chamber 102 and the circulator 114, and is operable to measure the power of the reflected microwave energy 142. In one embodiment, the transmitted power sensor 116 and the reflected power sensor 118 may comprise a microwave power sensor having an error of about ±5%. For example, a suitable power sensor may include the E9300A E-series power sensor manufactured by Agilent Technologies, which has an error accuracy of less than ±0.5%. However, it should be understood that any power sensor having a similar accuracy may also be used.

The transmitted power sensor 116 maybe electrically coupled to the PLC 122 via electrical lead 128 such that the transmitted power sensor 116 may send electrical signals to the PLC 122 indicative of the power of the transmitted microwave energy 140. Similarly, the reflected power sensor 118 may be electrically coupled to the PLC 122 via electric lead 132 such that the reflected power sensor 118 may send electrical signals to the PLC 122 indicative of the power of the reflected microwave energy 142.

In one embodiment, as shown in FIG. 1, the PLC 122 may also be electrically coupled to an input device 134 via electrical lead 130. The input device 138 may be operable to send electrical signals to the PLC 122 indicative of the load or total weight or mass of ceramic green bodies 126 positioned in the microwave heating chamber 102. Weight or mass of the ceramic green bodies, as used herein, refers to the weight of the ceramic material in the ceramic body as well as the weight of any liquid in the ceramic green body including, without limitation, water and/or any solvents or other processing agents introduced into the ceramic material during the formation of the ceramic green body. In one embodiment, the input device may be a keyboard or keypad operably connected to the PLC 122 such that an operator of the microwave dryer 100 may manually enter the weight of a ceramic green body entering the microwave heating chamber 102. The weight of the ceramic green bodies may be determined by periodically removing a green ceramic body from the transport system prior to the green ceramic body entering the microwave heating chamber and weighing the green ceramic body. The measured weight of the green ceramic body is then entered into the input device 138 and passed to the PLC 122.

In another embodiment, the input device 138 may comprise a scale or other measurement device positioned along the transport system 124 and operable to weigh each ceramic green body 126 as the ceramic green body enters the microwave heating chamber 102 such that the total weight of ceramic green bodies in the microwave heating chamber is known at any one time. For example, as shown in FIG. 1, a detector 154, such as an optical detector, an ultrasonic detector, or the like, may be positioned proximate the transport system 124 and operatively coupled to the PLC 122 with electric lead 156. The detector 154 may be operable to determine the number of ceramic green bodies present in the microwave heating chamber 102, including the number of fractional number of ceramic green bodies by detecting the ceramic green bodies as they are transported on the transport system 124. Based on this information, the PLC 122 may be operable to determine the total weight of green ceramic bodies positioned in the microwave heating chamber 102 at any one time.

Further, a temperature sensor 150, such as a pyrometer or a fiber optic temperature sensor, may be positioned proximate the transport system 124 and operatively coupled to the PLC 122 with electric lead 150. The temperature sensor 150 may be operable to determine the temperature of the ceramic green bodies as they enter the microwave heating chamber 102 and convey this information to the PLC 122. The PLC 122 may use the temperature data to approximate the amount of heating (e.g., the amount of microwave energy that needs to be applied) such that the green ceramic bodies have the desired moisture content upon exiting the microwave heating chamber 102.

In yet another embodiment, the input device 134 may be operable to send the PLC 122 electrical signals indicative of the number, weight, geometrical configuration and material composition of the ceramic green bodies 126 positioned in the microwave heating chamber 102. More specifically, the input device 134 may be a keyboard or keypad, as described above, and an operator of the microwave dryer may enter the number, weight, geometrical configuration and material composition into the input device which, in turn, sends electrical signals to the PLC 122 indicative of these variables. In this embodiment, the PLC 122 is operable to process the signals received from the input device 134 and, using these signals, adjust the power and/or frequency of the microwave energy generated by the microwave source accordingly. For example, when the geometrical configuration and material composition of the green ceramic bodies are entered into the input device 134, the PLC 122 may be programmed to increase or decrease the power of the microwave energy generated by the microwave source.

The PLC 122 may be programmed to vary the power and/or frequency of the microwave energy generated by the microwave source 112 based on electrical signals received from the transmitted power sensor 116, the reflected power sensor 118, the input device 134, the detector 154, and/or the temperature sensor 150. For example, in operation, one or more ceramic green bodies 126 may be placed on the transport system 124 such that the ceramic green bodies 126 are conveyed into the entrance 106 of the microwave heating chamber 102 of the microwave dryer 100. The PLC 122 of the microwave dryer 100 may be programmed to adjust the microwave energy generated by the microwave source 112 and transmitted into the microwave heating chamber 102 such that the ceramic green bodies 126 passing through the microwave heating chamber 102 are heated to a predetermined temperature. For example, the microwave dryer 100 may be operable to preheat, evaporatively heat or post-heat ceramic green bodies in the microwave heating chamber 102. As used herein, preheat or preheating refers to heating the ceramic green bodies without substantial evaporation of the liquid within the ceramic green bodies. Evaporatively heat or evaporative heating, as used herein, refers to heating and maintaining the ceramic green bodies at a temperature such that the moisture inside the ceramic green body is evaporated and thereby removed from the ceramic green body. Post-heat or post-heating, as used herein, refers to heating the ceramic green bodies to temperatures over the evaporative temperature of water to further remove any liquid from the ceramic green bodies. The operating conditions of the microwave dryer 100 may be adjusted using by the PLC 122 to achieve the necessary temperatures for preheating, evaporatively heating, and post-heating the ceramic green bodies.

In one embodiment, the weight of each ceramic green body entering the microwave heating chamber 102 is passed to the PLC 122 via the input device 134. This data may be manually entered or, in the alternative, automatically entered such as when the ceramic green bodies 126 pass over a scale or similar device operatively associated with the input device 134 and operable to measure the weight of the ceramic green body prior to entering the microwave heating chamber 102.

As the ceramic green bodies pass through the microwave heating chamber 102, the power of the transmitted microwave energy 140 transmitted into the microwave heating chamber 102 from the microwave source 112 is measured by the transmitted power sensor 116 which passes a signal indicative of the power of the transmitted microwave energy to the PLC 122. The power of the reflected microwave energy 142 reflected from the microwave heating chamber 106 is measured by the reflected power sensor 118 which passes a signal indicative of the power of the reflected microwave energy to the PLC 122. The PLC 122 may be programmed to adjust the power of the microwave energy generated by the microwave source 112 based on the signals received from the transmitted power sensor 116, the reflected power sensor 118, the temperature sensor 150, the detector 154 and the input device 134 (e.g., weight, composition and/or geometry) and thereby heat the ceramic green bodies 126 positioned in the microwave heating chamber to the desired preheat, evaporative heating or post-heating temperature. The magnitude of the power of the reflected energy is at least partially effected by the composition (including the composition of moisture or liquid in the green ceramic bodies) and the geometry of the green ceramic bodies positioned in the microwave heating chamber. Accordingly, when the power of the microwave energy generated by the microwave source is adjusted based on the measured power of the reflected microwave energy, such factors as geometry and composition are also taken into consideration However, it should also be understood that information concerning the composition and geometry of the green ceramic bodies may also be separately input into the PLC 122 with the input device 134 and used to adjust the power of the microwave energy generated. Accordingly, the microwave dryer 100 may be controlled through closed-loop feedback control based on the feed back signals received from the transmitted power sensor 116 and the reflected power sensor 118 and/or the temperature sensor 150, the detector 154 and the input device 134.

In one embodiment, the PLC maybe programmed to adjust the power of the microwave energy generated by the microwave energy source according to the mathematical relationship:

$$P_{source} = \frac{C_{dissipated} \cdot \sum_{i=1}^{N} w_i}{\eta_e \left(1 - \frac{P_{reflected}}{P_{transmitted}}\right)}$$

where $P_{source}$ is the adjusted power of the microwave source, $C_{dissipated}$ is the power dissipation coefficient for a desired status (e.g., temperature and/or moisture content) of a ceramic green body exiting the microwave heating chamber and is based on the composition of the ceramic green body and the geometry of the green ceramic body, $$\sum_{i=1}^{N} w_i$$

is the total weight of ceramic green bodies in the microwave heating chamber, $\eta_e$ is the efficiency coefficient of the microwave power source, $P_{reflected}$ is the power of the reflected microwave energy reflected from the microwave heating chamber, and $P_{transmitted}$ is the power of the microwave energy transmitted to the microwave heating chamber. This mathematical relationship is derived from the thermal balance of a ceramic green body positioned in the microwave heating chamber which will now be discussed in more detail.

The thermal balance of the $k^{th}$ ceramic green body of N ceramic green bodies (e.g., each ceramic green body is the $k^{th}$ ceramic green body of N ceramic green bodies where k is an integer from 1 to N) positioned in a microwave heating chamber over a time t may be expressed as differential equations for temperature $T_k$ and dryness $D_k$ for specific temperature conditions. Specifically:

$$\frac{dT_k}{dt} = \begin{cases} \frac{p_{k\_dissipated}}{C_{p\_wet} \cdot w_k} & T_k < T_e \, ^\circ C. \\ 0 & T_k = T_e \, ^\circ C. \\ \frac{p_{k\_dissipated}}{C_{p\_dry} \cdot w_k} & T_k > T_e \, ^\circ C. \end{cases} \quad (1)$$

$$\frac{dD_k}{dt} = \begin{cases} 0 & T_k < T_e \, ^\circ C. \\ \frac{p_{k\_dissipated}}{H_v \cdot w_k \cdot R_{H_2O}} & T_k = T_e \, ^\circ C. \\ 0 & T_k > T_e \, ^\circ C., \end{cases} \quad (2)$$

where, $p_{k\_dissipated}$ is the dissipation power of a ceramic green body k, $w_k$ is the initial weight of a ceramic green body k, $C_{p\_wet}$ and $C_{p\_dry}$ are the heat capacities of the ceramic green bodies when the ceramic green bodies are wet and dry, respectively, $H_v$ is the latent energy of water, $T_e$ is the water evaporative temperature and $R_{H_2O}$ is the batch water composition by weight percent.

To relate the dissipation power of the $k^{th}$ ceramic green body to the dissipation power of the microwave heating chamber ($P_{dissipated}$), a competing factor ($f_k$) may be introduced such that the dissipation power of a ceramic green body k is:

$$p_{k\_dissipated} = P_{dissipated} \cdot f_k \quad (3).$$

Assuming only ceramic green bodies in the microwave heating chamber dissipate microwave power, the competing factors for each of the N ceramic green bodies should satisfy the conservation of energy for the dissipated power in the microwave heating chamber such that:

$$\sum_{k=1}^{N} f_k = 1. \quad (4)$$

Based on conservation of energy, the microwave power dissipated ($P_{dissipated}$) in the microwave heating chamber (e.g., the microwave power which goes into heating and drying the ceramic green bodies in the microwave chamber) can be expressed in terms of the power of the transmitted microwave energy ($P_{transmitted}$) transmitted into the microwave heating chamber and the power of the reflected microwave energy ($P_{reflected}$) reflected from the microwave heating chamber such that:

$$P_{dissipated} = P_{transmitted} - P_{reflected} \quad (5).$$

Assuming that the dissipation power is distributed among the ceramic green bodies positioned in the microwave heating chamber according to the weight of each ceramic green body, the competing factor for each ceramic green body may be written as:

$$f_k = \frac{w_k}{\sum_{i=1}^{N} w_i}. \quad (6)$$

Using equations (3) and (6), differential equations (1) and (2) may be rewritten as:

$$\frac{dT_k}{dt} = \begin{cases} \frac{P_{dissipated}}{C_{p\_wet} \cdot w_k} & T_k < T_e \, ^\circ C. \\ 0 & T_k = T_e \, ^\circ C. \\ \frac{P_{dissipated}}{C_{p\_dry} \cdot w_k} & T_k > T_e \, ^\circ C. \end{cases} \quad (7)$$

and $$\frac{dD_k}{dt} = \begin{cases} 0 & T_k < T_e \, ^\circ C. \\ \frac{P_{dissipated}}{H_v \cdot R_{H_2O} \cdot \sum_{i=1}^{N} w_i} & T_k = T_e \, ^\circ C. \\ 0 & T_k > T_e \, ^\circ C. \end{cases} \quad (8)$$

If the initial status (e.g., moisture content and weight) of all the ceramic green bodies are the same before entering the microwave heating chamber, ceramic green bodies having the same final status (e.g., temperature, moisture content and weight) exiting the microwave heating chamber may be achieved by keeping the right hand terms of differential equations (7) and (8) constant for each of the N ceramic green bodies. This may be accomplished by keeping the dissipated power ($P_{dissipated}$) constant for the N ceramic green bodies such that the dissipated power coefficient ($C_{dissipated}$) is a constant defined as:

$$C_{dissipated} = \frac{P_{dissipated}}{\sum_{i=1}^{N} w_i}, \quad (9)$$

which, when rewritten, leads to the following relationship defining the power dissipated in the microwave heating chamber:

$$P_{dissipated} = C_{dissipated} \cdot \sum_{i=1}^{N} w_i. \quad (10)$$

Accordingly, the dissipation power of the microwave heating chamber varies in direct proportion to the weight of the ceramic green bodies positioned in the microwave heating chamber. The power dissipation coefficient ($C_{dissipated}$) may be determined using equations (7) and (8) according to the required status change (e.g., a desired change in the temperature of a ceramic green body in a specified time and/or dryness of the ceramic green body in a specified time) of the ceramic green bodies passing through the microwave heating chamber.

For example, for a plurality of N ceramic green bodies of known weight and wet heat capacity ($C_{p\_wet}$), it may be desirable for each ceramic green body to reach a specified temperature (e.g., a temperature increase of dT) over a specified time interval (dt). The specified temperature, the time interval, the weight of the ceramic green bodies and the heat capacity may be used to solve equation (7) for $P_{dissipated} \cdot P_{dissipated}$ and the total weight of the ceramic green bodies may then be used in equation (9) to determine the power dissipation coefficient ($C_{dissipated}$). The determined value of $C_{dissipated}$ may then be used to determine the appropriate power of microwave energy generated by the microwave source to produce the desired final temperature and/or dryness of the green ceramic bodies, as will be discussed further herein.

To more precisely determine the power of the microwave energy generated by the microwave source necessary to reach the desired final temperature and/or dryness for green ceramic bodies exiting the microwave heating chamber, the efficiency of the microwave source must be taken into consideration. The power of the microwave energy ($P_{source}$) generated by the microwave source may not be of the same magnitude as the power of the transmitted microwave energy ($P_{transmitted}$) transmitted from the microwave source due to inefficiencies and losses in the microwave source. However, the power of the microwave energy generated ($P_{source}$) may be related to the power of the transmitted microwave energy ($P_{transmitted}$) using an efficiency coefficient ($\eta_e$) such that $$P_{transmitted} = \eta_e \cdot P_{source} \quad (11)$$

The reflected power and input power may be related by a reflection factor $\rho$ such that $$\frac{P_{reflected}}{P_{transmitted}} = |\rho|^2, \quad (12)$$

where $\rho$ is determined by the wave impedance $Z_0$ of the waveguide coupling the microwave source and the microwave heating chamber and the load impedance of the microwave heating chamber $Z_L$ such that $$\rho = \frac{Z_L - Z_0}{Z_L + Z_0}. \quad (13)$$

Accordingly, using equations (11) and (12), equation (5) maybe rewritten as $$P_{dissipated} = P_{transmitted} - P_{reflected} = P_{transmitted}(1 - |\rho|^2)$$
$$= P_{source} \cdot \eta_e (1 - |\rho|^2) \quad (14).$$

Using equation (14), equation (10) may be rewritten as $$P_{source} = C_{dissipated} \cdot \sum_{i=1}^{N} w_i / [\eta_e (1 - |\rho|^2)] \quad (15)$$

which, in the alternative, may be written as:

$$P_{source} = \frac{C_{dissipated} \cdot \sum_{i=1}^{N} w_i}{\eta_e \left(1 - \frac{P_{reflected}}{P_{transmitted}}\right)}. \quad (16)$$

Either of equations (15) or (16) may be used to adjust and control the power of the microwave energy ($P_{source}$) generated by the microwave source (e.g., the magnetron) to yield ceramic green bodies having the desired temperature and/or dryness upon exiting the microwave heating chamber.

More specifically, as discussed hereinabove, equations (7) and (8) may be used in conjunction with equation (9) to solve for the power dissipation coefficient ($C_{dissipated}$) required for a particular ceramic green body to reach a particular status (e.g., final temperature and/or dryness) upon exiting the microwave heating chamber. Thereafter, the power dissipation coefficient may be substituted into equation (16) and used in conjunction with the measured weight of the ceramic green bodies positioned in the microwave heating chamber, the measured power of the transmitted microwave energy, the measure power of the reflected microwave energy and the efficiency coefficient of the microwave source to determine the power of the microwave energy that must be generated by the microwave source such that the ceramic green bodies reach the desired final temperature and/or dryness.

Figure 2:
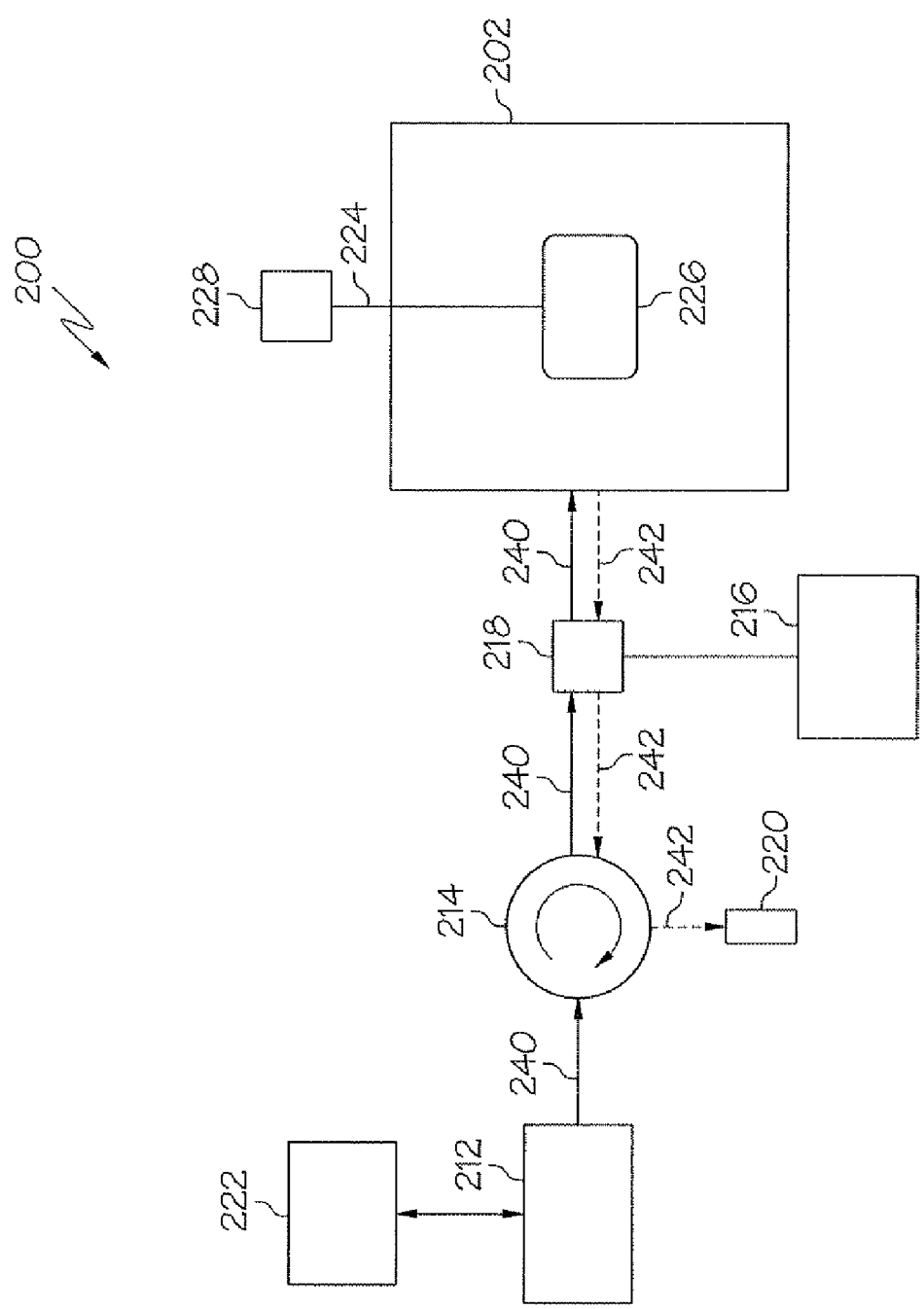
FIG. 2 is a schematic view of the microwave drying test apparatus used to verify the method for heating ceramic green bodies with microwaves according to one or more embodiments shown and described herein.

Referring now to FIG. 2, a microwave drying test apparatus 200 is depicted which was used to experimentally verify the assumptions used to arrive at equation (16). The microwave drying test apparatus 200 generally comprised a microwave source 212 operatively coupled to a microwave heating chamber 202 such that microwave energy generated in the microwave source 212 was transmitted to the microwave heating chamber 202. The microwave source 212 comprised a 915 MHz magnetron capable of providing microwave energy having variable power in the range up to about 75 kW. The microwave source 212 was electrically coupled to a control unit 222 operable to vary the power of the microwave source 212. A circulator 214 was disposed between the microwave source 240 and the microwave heating chamber 202 such that transmitted microwave energy 240 from the microwave source 212 to the microwave heating chamber 202 passed through circulator 214 and reflected microwave energy 242 from the microwave heating chamber 202 was redirected by the circulator 214 into a dissipating load 220 operatively attached to the circulator 220.

The microwave drying test apparatus 200 also comprised a power sensor 216, specifically the E9300 A power sensor manufactured by Agilent Technologies. The power sensor 216 was operatively coupled to the microwave drying test apparatus 200 with a waveguide 218 comprising two directional couplers (not shown) which facilitated coupling either the transmitted microwave energy 240 or the reflected microwave energy 242 into the power sensor 216.

To perform the verification tests, a measured quantity of water 226 was placed in the microwave heating chamber 202. A fiber optic temperature probe 224 of a data acquisition system 228 was placed in the water 226. The data acquisition system 228 was operable to display and record the temperature of the water as measured by the probe 224. The PLC 222 connected to the microwave power source 212 was set to operate the microwave power source 212 at a predetermined power level for a specified time interval. The power level and time interval were selected to insure that the final temperature of the water in the microwave heating chamber 202 did not exceed 100° C. The weight of the water, the initial temperature of the water, the final temperature of the water, the time interval, the measured power of the transmitted microwave energy, the measured power of the reflected microwave energy and the resulting measured increase in temperature ($\Delta T_M$) are shown in Table 1 below for five different verification trials.

TABLE 1

| Sample No. | Weight (kg) | Start Temp. (° C.) | Final Temp. (° C.) | Duration (Sec.) | Transmitted Power (kW) | Reflected Power (kW) | $\Delta T_C$ (° C.) Calculated | $\Delta T_M$ (° C.) Measured |
|---|---|---|---|---|---|---|---|---|
| 1 | 13.39 | 29 | 88.6 | 385.00 | 10.00 | 1.57 | 57.95 | 59.6 |
| 2 | 13.45 | 23 | 81 | 385.00 | 10.17 | 1.72 | 57.83 | 58 |
| 3 | 13.39 | 17 | 82.7 | 198 | 21.45 | 2.31 | 67.73 | 65.7 |
| 4 | 13.31 | 17 | 81.8 | 198 | 21.45 | 1.96 | 69.30 | 64.8 |
| 5 | 13.37 | 25 | 83 | 385 | 10.17 | 1.72 | 58.21 | 58 |

Figure 3:
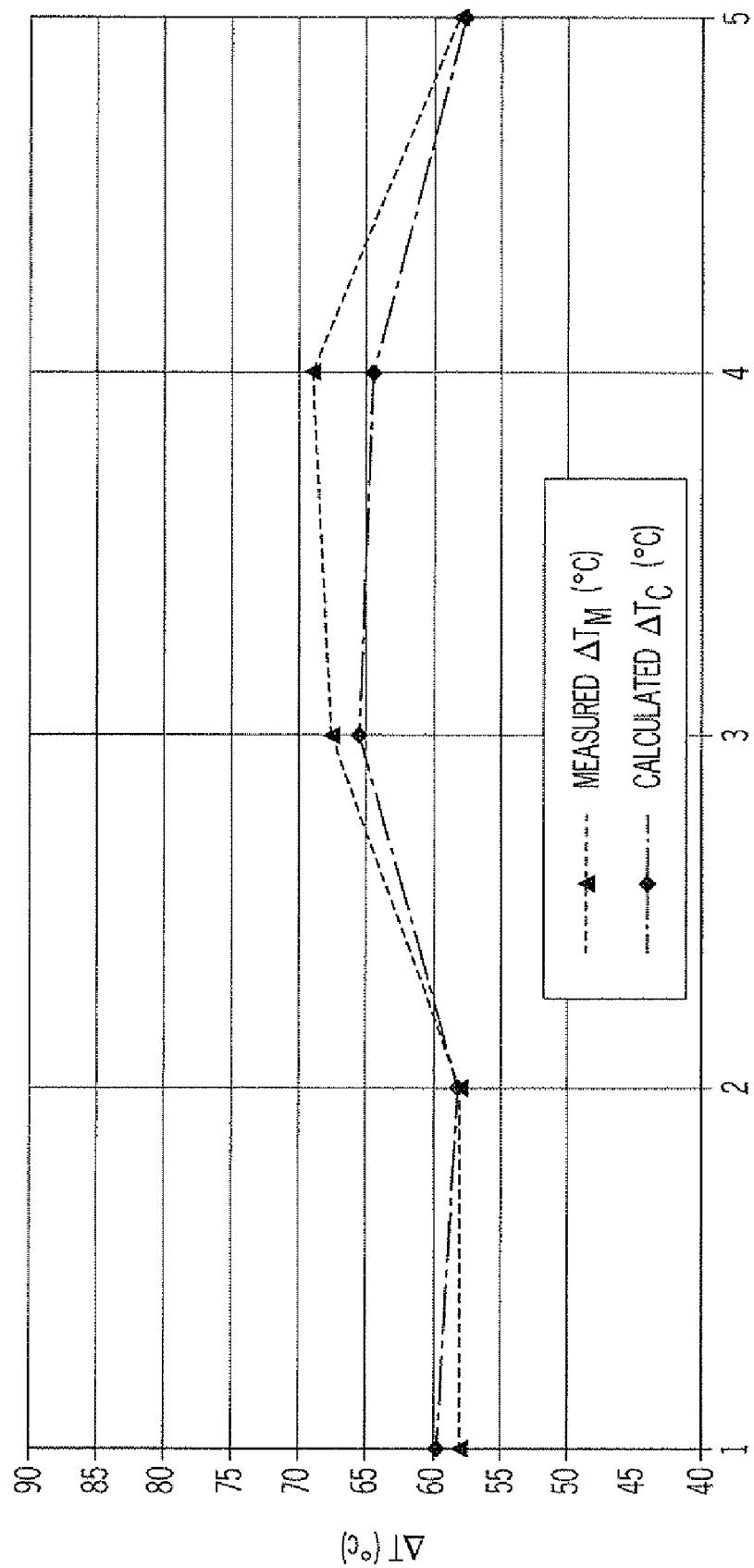
FIG. 3 is a comparative plot of temperature data measured with microwave drying test apparatus shown in FIG. 2 and temperature data calculated using the transmitted microwave power and the reflected microwave power according to one embodiment of the present invention shown and described herein.

Also shown in Table 1 are the calculated values for the increase in temperature using the methodology described herein. The calculated value ($\Delta T_C$) assumes that the microwave power dissipated in the microwave heating chamber is the difference between the power of the transmitted microwave energy and the reflected microwave energy which is the basis of the control model described herein. The corresponding increase in temperature may be determined from equations (7) and (5) above such that:

$$\Delta T_C = \frac{(P_{transmitted} - P_{reflected})}{C_{p\_water} W_w} t$$

where $\Delta T_C$ is the increase in the temperature of the water, $P_{transmitted}$ is the power of the transmitted microwave energy, $P_{reflected}$ is the power of the reflected microwave energy, $C_{P\_water}$ is the heat capacity of the water sample, and $W_W$ is the weight of the water (the expression:

$$\sum_i^N w_i$$

from equation (7) is simplified to $W_W$ as only one water sample is placed in the microwave heating chamber) and t is the heating time. FIG. 3 shows the values of $\Delta T_M$ and $\Delta T_C$ plotted for each of the verification samples of Table 1. As shown in FIG. 3, $\Delta T_C$, as calculated utilizing the power of the transmitted microwave energy, the reflected microwave energy and the load (e.g., the weight of the water sample) demonstrates good agreement with the actual measured value of the increase in temperature ($\Delta T_M$).

Accordingly, the experimental results of FIG. 3 demonstrate that, in order to accurately predict and thereby control the temperature in the microwave heating chamber, the power of both the transmitted microwave energy and the reflected microwave energy should be taken into consideration along with the weight of the materials contained within the microwave heating chamber. Moreover, the experimental results shown in FIG. 3 also validate the assumptions made in developing the method of controlling the microwave source described herein and confirm that the method may be used to improve control over the temperature of the microwave heating chamber and thereby decrease temperature variations between ceramic green bodies subjected to the same drying conditions such as transmitted microwave power.

Referring again to FIG. 1, it should now be understood that the mathematical relationship defined in equation (16) may be used in conjunction with a microwave dryer such as the microwave dryer depicted in FIG. 1 to achieve closed loop feed back control of the microwave dryer and thereby reduce the temperature variability amongst ceramic green bodies passing through the microwave dryer.

More specifically, the PLC 122 of the microwave dryer 100 maybe programmed to adjust the power of the microwave energy generated by the microwave source 112 according to equation (16). In this embodiment, the efficiency coefficient ($\eta_e$) of the microwave source 112 may be calculated for each moment in time by measuring the reflected power and the transmitted power and determining the efficiency coefficient using equation (11). The power of the transmitted microwave energy ($P_{transmitted}$) and the power of the reflected microwave energy ($P_{reflected}$) may be determined with the transmitted power sensor 116 and the reflected power sensor 118, respectively, and electrical signals indicative of the measured powers transmitted to the PLC 122 for use in conjunction with equation (16). The mass of the ceramic green bodies may be input into the PLC 122 with the input device 134 either manually or automatically, such as when the input device is operably coupled to scale or other device operable to weigh the ceramic green bodies prior to entering the microwave heating chamber 100. Finally, the dissipated power coefficient ($C_{dissipated}$) may be calculated using equations (7), (8) and (9) for a desired temperature and/or dryness of the ceramic green bodies. Using this information in conjunction with the mathematical relationship of equation (16), the PLC 122 of the microwave dryer 100 may be operable to adjust the power of the microwave energy generated by the microwave source 112 such that the ceramic green bodies in the microwave heating chamber 102 are heated to the desired temperature.

Further, it should also be understood that equation (16) may be used to specifically configure the microwave dryer 100 for preheating, evaporative heating and post heating by determining the dissipated power coefficient ($C_{dissipated}$) for the desired type of heating.

It should also be understood that the control methods and microwave dryers shown and described herein may be used in a system for drying ceramic green bodies in a ceramic manufacturing operation. In one embodiment, a plurality of microwave dryers, such as those depicted in FIG. 1, may be arranged over a transport system, such as the transport system described herein, such that ceramic green bodies positioned on the transport system may be conveyed from one microwave heating chamber to the next. Each microwave dryer may be programmed to heat ceramic green bodies positioned in the microwave heating chamber by a specified amount before the ceramic green bodies exit the microwave heating chamber and continue on to the next microwave dryer. More specifically, the PLC of each microwave dryer in the system may be programmed to control the power of the microwave source according to equation (16) above. Moreover, the power dissipation coefficient ($C_{dissipated}$) used in equation (16) may be individually determined for each microwave dryer in the system such that each microwave dryer may be operable to heat the ceramic bodies to a desired, predetermined temperature and/or dryness.

For example, in one embodiment, three microwave dryers each having a configuration similar to the microwave dryer 100 described in FIG. 1 above may be oriented around the transport system such that ceramic green bodies positioned on the transport system pass through each of the microwave dryers. Each of the microwave dryers may be configured for preheating, evaporative heating or post-heating the ceramic green bodies positioned in the respective microwave heating chambers of the microwave dryers.

In one embodiment, the first microwave dryer may be used to pre-heat the ceramic green bodies to a temperature of less than the water evaporative temperature. To accomplish this, the power dissipation coefficient ($C_{dissipated}$) of equation (16) used in conjunction with the first microwave dryer may be determined for a specific temperature of less than about the water evaporative temperature. The second microwave dryer may be set for evaporative heating of the ceramic green bodies. As such, the power dissipation coefficient ($C_{dissipated}$) of equation (16) used in conjunction with the second microwave dryer may be calculated to facilitate evaporation of most of the moisture contained in the ceramic green bodies. The third microwave dryer may be used to post-heat the ceramic green bodies to a desired post-heating temperature. Accordingly, the power dissipation coefficient ($C_{dissipated}$) of equation (16) used in the third microwave dryer may be determined such that a desired post-heating is maintained within the microwave drying chamber to drive off any remaining moisture such that, when the ceramic green bodies exit the third microwave dryer, the green ceramic bodies contain less than about 5% of their original moisture content.

The methods, microwave dryers and systems described herein are particularly suitable for heating, and thereby drying, thin wall ceramic green bodies. Drying, as used herein, refers to a reduction in the liquid content of the body to a desired value. The heating and drying of the ceramic green bodies is carried out to a degree where the ceramic green body can be mechanically handled without causing any damage thereto or unacceptable deformation thereof. For example, ceramic green bodies of the thin wall cylindrical body type, such as cylindrical ceramic green bodies having a cellular structure exhibiting a cell density from about 100 to about 1600 cells/in$^2$, are sufficiently dry for mechanical handling purposes when the ceramic green body has less than about 5% of its original moisture content. In another embodiment, the ceramic green bodies are sufficiently dry for mechanical handling purposes when the ceramic green body has less than about 1% of its original moisture content.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for heating ceramic green bodies, the method comprising:
   providing one or more of the ceramic green bodies in a microwave heating chamber;
   determining a total mass of the one or more ceramic green bodies present in the microwave heating chamber;
   generating microwave energy with a microwave source;
   transmitting the microwave energy from the microwave source to the microwave heating chamber;
   measuring a transmitted power of the microwave energy transmitted from the microwave source to the microwave heating chamber;
   measuring a reflected power of reflected microwave energy reflected from the microwave heating chamber; and
   adjusting a power of the microwave energy transmitted from the microwave source to the microwave heating chamber in response to: inputs corresponding to the total mass of the one or more ceramic green bodies present in the microwave heating chamber, the measured transmitted power, and the measured reflected power.

2. The method of claim 1 wherein the ceramic green bodies are heated to below an evaporation temperature of liquid contained in the ceramic green bodies.

3. The method of claim 1 wherein liquid is evaporated from the one or more ceramic green bodies.

4. The method of claim 1 wherein:
   the transmitted power of the microwave energy is measured with a transmitted power sensor disposed between the microwave source and the microwave heating chamber; and
   the reflected power of the reflected microwave energy is measured with a reflected power sensor disposed between the microwave heating chamber and the microwave source.

5. The method of claim 4 further comprising:
   a programmable controller operatively connected to the microwave source, the transmitted power sensor and the reflected power sensor, wherein the programmable controller is operable to:
   receive electrical signals as input from the transmitted power sensor indicative of the transmitted power of the microwave energy;
   receive electrical signals as input from the reflected power sensor indicative of the reflected power of the reflected microwave energy; and
   adjust the power of the microwave energy generated by the microwave source based on input signals corresponding to the transmitted power of the microwave energy and the reflected power of the reflected microwave energy and on the input corresponding to the total mass of the one or more ceramic green bodies.

6. The method of claim 5 wherein the programmable controller is programmed to heat the ceramic green bodies with a heating regimen selected from the group consisting of: preheating the ceramic green bodies to temperature(s) lower than an evaporation temperature of liquid in the ceramic green bodies, evaporating liquid from the ceramic green bodies, post-heating the ceramic green bodies to temperature(s) above the evaporation temperature of liquid in the ceramic green bodies, or combinations thereof.

7. The method of claim 1 wherein the power of the microwave energy is up to about 200 kW and comprises a frequency of greater than about 10 MHz.

8. The method of claim 7 wherein the power of the microwave energy is from about 30 kW to about 60 kW with a frequency from about 20 MHz to about 5000 MHz.

9. A combination of a microwave dryer and ceramic green bodies, the microwave dryer comprising a microwave source, a transmitted power sensor, a reflected power sensor, a programmable controller and a microwave heating chamber wherein:
  the microwave source is operatively coupled to the microwave heating chamber such that microwave energy generated by the microwave source is transmitted to the microwave heating chamber, wherein the ceramic green bodies are positioned in the microwave heating chamber;
  the transmitted power sensor is disposed between the microwave source and the microwave heating chamber and is operable to measure a transmitted power of the microwave energy transmitted by the microwave source to the microwave heating chamber;
  the reflected power sensor is disposed between the microwave heating chamber and the microwave source and is operable to measure a reflected power of reflected microwave energy reflected from the microwave heating chamber; and
  the programmable controller is operatively connected to the microwave source, the transmitted power sensor and the reflected power sensor and is operable to adjust a power of the microwave energy generated by the microwave source based on electrical signals received from the transmitted power sensor and the reflected power sensor.

10. The combination of claim 9 wherein the microwave dryer further comprises a circulator and a dissipating load wherein, the circulator is disposed between the microwave source and the reflected power sensor and is operatively connected to the dissipating load such that the reflected microwave energy reflected from the microwave heating chamber is diverted by the circulator into the dissipating load.

11. The combination of claim 9 wherein the microwave dryer further comprises a temperature sensor operatively coupled to the programmable controller and positioned proximate an entrance of the microwave heating chamber, wherein the temperature sensor is operable to measure a temperature of ceramic green bodies entering the microwave heating chamber and the programmable controller is further operable to adjust the power of the microwave source based on electrical signals received from the temperature sensor.

12. The combination of claim 9 wherein the microwave dryer further comprises a detector operatively coupled to the programmable control unit and positioned proximate an entrance of the microwave heating chamber, wherein the detector is operable to detect ceramic green bodies entering the microwave heating chamber and the programmable controller is further operable to adjust the power of the microwave source based on electrical signals received from the temperature sensor.

13. The combination of claim 9 wherein the power of the microwave energy is less than or equal to about 200 kW and comprises a frequency of greater than about 10 MHz.

14. The combination of claim 9 wherein the programmable controller is operable to adjust the power of the microwave energy generated by the microwave source based on the transmitted power of the microwave energy transmitted by the microwave source to the microwave heating chamber, the reflected power of the reflected microwave energy reflected by the microwave heating chamber, a total weight of ceramic green bodies in the microwave heating chamber, and an efficiency of the microwave source.

15. The combination of claim 9 wherein the microwave dryer is programmed with heating regimens selected from the group consisting of: pre-heating the ceramic green bodies to temperature(s) lower than an evaporation temperature of liquid in the ceramic green bodies, evaporating liquid from the ceramic green bodies, post-heating the ceramic green bodies to temperature(s) above the evaporation temperature of liquid in the ceramic green bodies, or combinations thereof.

16. A combination of a dryer system and ceramic green bodies, the dryer system comprising a plurality of microwave dryers and a transport system wherein:
  the microwave dryers are oriented along the transport system such that the transport system passes the ceramic green bodies through each microwave dryer;
  the microwave dryers comprise a microwave source, a transmitted power sensor, a reflected power sensor, a programmable controller and a microwave heating chamber wherein:
    the microwave source is operatively coupled to the microwave heating chamber such that microwave energy generated by the microwave source is transmitted to the microwave heating chamber;
    the transmitted power sensor is disposed between the microwave source and the microwave heating chamber and is operable to measure a transmitted power of microwave energy transmitted by the microwave source to the microwave heating chamber;
    the reflected power sensor is disposed between the microwave heating chamber and the microwave source and is operable to measure a reflected power of reflected microwave energy reflected from the microwave heating chamber; and
    the programmable controller is operatively connected to the microwave source, the transmitted power sensor and the reflected power sensor and is operable to adjust a power of the microwave energy generated by the microwave source based on electrical signals received from the transmitted power sensor and the reflected power sensor; and
  the microwave dryers are individually programmed to selectively heat the ceramic green bodies passing through the microwave heating chamber.

17. The combination of claim 16 wherein the programmable controller of each microwave dryer is operable to adjust the power of the microwave energy generated by the microwave source based on the transmitted power of the microwave energy transmitted by the microwave source to the microwave heating chamber, the reflected power of the reflected microwave energy reflected by the microwave heating chamber, a total weight of the ceramic green bodies in the microwave heating chamber, and an efficiency of the microwave source.

18. The combination of claim 16 wherein each of the plurality of microwave dryers are programmed with heating regimens selected from the group consisting of: pre-heating the ceramic green bodies to temperature(s) lower than an evaporation temperature of liquid in the ceramic green bodies, evaporating liquid from the ceramic green bodies, post-heating the ceramic green bodies to temperature(s) above the evaporation temperature of liquid in the ceramic green bodies, or combinations thereof.

* * * * *